T. G. LEWIS.
CIRCUIT CONTROLLER.
APPLICATION FILED DEC. 10, 1919.

1,400,886.

Patented Dec. 20, 1921.

Inventor,
Theodore G. Lewis,
by Geyer Popp
Attorneys.

UNITED STATES PATENT OFFICE.

THEODORE G. LEWIS, OF BUFFALO, NEW YORK, ASSIGNOR TO BUFFALO DENTAL MANUFACTURING COMPANY, OF BUFFALO, NEW YORK, A CORPORATION OF NEW YORK.

CIRCUIT-CONTROLLER.

1,400,886. Specification of Letters Patent. Patented Dec. 20, 1921.

Application filed December 10, 1919. Serial No. 343,842.

*To all whom it may concern:*

Be it known that I, THEODORE G. LEWIS, a citizen of the United States, residing at Buffalo, in the county of Erie and State of New York, have invented new and useful Improvements in Circuit-Controllers, of which the following is a specification.

This invention relates to a circuit controller designed more especially for use in connection with the pressure regulator of a dental vulcanizer, but the device is also serviceable for controlling the circuits of other apparatus of various kinds.

In electric vulcanizers, it is necessary to promptly cut off the current supply to the heating coil when the temperature reaches 320 degrees Fahrenheit.

The principal object of my invention is the provision of a simple and reliable circuit controller of this character in which a relatively slight movement of the diaphragm of the pressure regulator will produce a comparatively long stroke of the movable contact-member of the circuit controller, in order to effect the required quick change in the condition of the circuit to stop the current supply the instant the above predetermined temperature is reached.

Figure 1:
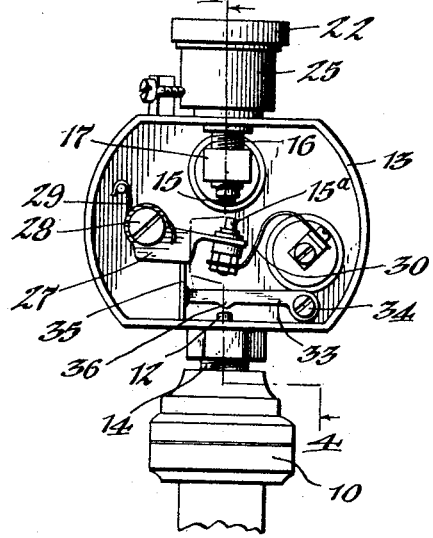
Figure 2:
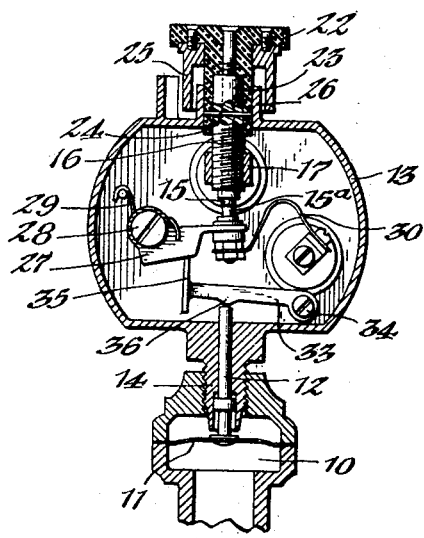
Figure 3:
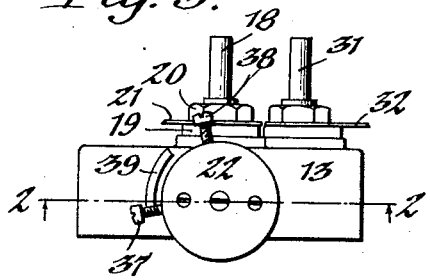
Figure 4:
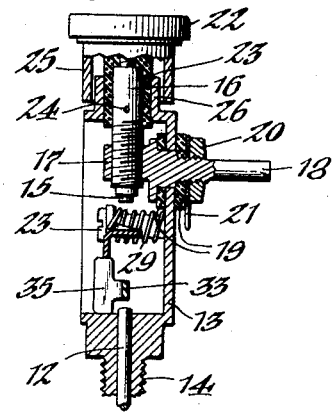

In the accompanying drawings:

Figure 1 is a front elevation of the circuit controller with the cover removed. Fig. 2 is a vertical section thereof on line 2—2, Fig. 3. Fig. 3 is a top plan view of the same. Fig. 4 is a transverse vertical section on line 4—4, Fig. 1.

Similar characters of reference indicate corresponding parts in the several views.

10 indicates the diaphragm-chamber of a suitable pressure regulator, such for example, as used in connection with dental vulcanizers, and 11 indicates the flexible diaphragm arranged in said chamber and acting on an upright thrust rod 12 which in turn operates the improved circuit controller. The controller shown in the drawings is of the normally-open circuit type and adapted to coöperate with a relay-switch, not shown, which is normally closed to connect the heating element with the source of current, while when the controller contacts are closed, the relay switch is opened and the current supply to the heating element is cut off.

The controller comprises a casing 13 surmounting the pressure regulator and provided with a depending screw-nipple 14 which engages a threaded opening in the top of the pressure chamber 10. Arranged in this casing are the terminal-contacts 15 and 15ª of the controller. One of these contacts, say the upper one 15, is relatively stationary and preferably adjustable, while the other 15ª is movable toward and from the same. In the embodiment of the improvement shown in the drawings, the upper contact is carried by a vertical adjusting screw 16 which engages a threaded eye or sleeve 17 arranged at the inner end of a binding post 18 which extends through the rear wall of the casing. This post is suitably insulated from the casing, as shown at 19, and provided with a nut 20 for clamping the corresponding circuit terminal 21 thereon. The adjusting screw 16 extends through the top of the casing and is provided with suitable means for turning it, such as a knob 22 of insulating material having a tubular stem 23 in which the upper portion of the screw is secured by a cross pin 24 or other fastening. Preferably secured to the head of this knob is a hood 25 which overlaps the neck 26 of the casing.

The movable contact 15ª of the circuit controller is mounted on the free end of a vertically-swinging arm or lever 27 pivoted upon a stud 28 projecting into the casing from its rear wall. A spring 29, preferably coiled about this stud, tends to swing the contact-lever 27 away from the stationary contact 15. The movable contact 15ª is connected by a conductor 30 with a second binding post 31 which extends through the back of the casing and from which the other circuit terminal 32 leads. This conductor may consist of a strip of copper or other suitable flexible material.

Arranged underneath the contact-lever 27 is a vertically-swinging actuating lever 33 pivoted on a stud 34 carried by the back of the casing and having a head 35 which bears against the underside of the the contact-lever near its fulcrum. Interposed between the actuating lever and the diaphragm 11 is the sliding thrust-rod 12 which preferably bears at its upper end against a point 36 at the lower edge of said lever.

Assuming the controller to be applied to a dental vulcanizer, for example, the circuit normally is broken at the controller contacts, as shown in Fig. 1, so long as the temperature in the vulcanizer is below a predetermined degree, say 320 degrees Fahrenheit, the upward deflection of the diaphragm 11 under these conditions being insufficient to close the movable contact 15ª against the stationary contact 15. The moment, however, that the temperature reaches said maximum, the controller circuit is promtly closed, opening the relay switch and cutting the heating coils of the vulcanizer out of the supply circuit. This prompt action is effected by the arrangement of parts herein shown and described which produces a long stroke of the contact-lever 27 for a relatively small movement of the diaphragm thrust-rod 12.

The upper contact 15 can be adjusted as required, by simply turning its knob 22 in one or the other direction. If desired, the knob may be provided with stop-screws 37, 38, adapted to engage opposite ends of a stop or lug 39 projecting from the top of the casing, for predetermining the proper positions of said adjustable contact to cut off the current supply at one or another of two temperatures, say 300 degrees and 320 degrees Fahrenheit. The stop lug is of the proper length and the stop screws are properly disposed for this purpose.

I claim as my invention:

A circuit controller, comprising a casing provided at its bottom with a hollow attaching-nipple, binding posts extending through the back of the casing, one of said posts being provided within the casing with an internally-threaded eye, an adjusting screw engaging said eye and carrying a terminal-contact, a contact-lever arranged in the casing and carrying a terminal contact adapted to engage said adjustable contact, a flexible conductor connecting the last-named contact with the other of said binding posts, an actuating lever engaging said contact lever, and a thrust-rod guided in said nipple for operating said actuating lever.

THEODORE G. LEWIS.